US011797854B2

(12) United States Patent
Markhasin et al.

(10) Patent No.: US 11,797,854 B2
(45) Date of Patent: Oct. 24, 2023

(54) IMAGE PROCESSING DEVICE, IMAGE PROCESSING METHOD AND OBJECT RECOGNITION SYSTEM

(71) Applicant: Sony Semiconductor Solutions Corporation, Kanagawa (JP)

(72) Inventors: Lev Markhasin, Stuttgart (DE); Yalcin Incesu, Stuttgart (DE)

(73) Assignee: Sony Semiconductor Solutions Corporation, Kanagawa (JP)

(*) Notice: Subject to any disclaimer, the term of this patent is extended or adjusted under 35 U.S.C. 154(b) by 50 days.

(21) Appl. No.: 16/913,950

(22) Filed: Jun. 26, 2020

(65) Prior Publication Data
US 2021/0012106 A1 Jan. 14, 2021

(30) Foreign Application Priority Data
Jul. 8, 2019 (EP) .................................... 19184963

(51) Int. Cl.
| | | |
|---|---|---|
| *G06V 20/52* | (2022.01) | |
| *G06V 40/10* | (2022.01) | |
| *G06N 3/082* | (2023.01) | |
| *G06F 18/21* | (2023.01) | |

(52) U.S. Cl.
CPC ............. *G06N 3/082* (2013.01); *G06F 18/21* (2023.01); *G06V 20/52* (2022.01); *G06V 40/103* (2022.01)

(58) Field of Classification Search
CPC ...... G06V 20/00; G06V 20/52; G06V 40/103; G06K 9/6217; G06N 3/082; G06N 3/0454
See application file for complete search history.

(56) References Cited

U.S. PATENT DOCUMENTS

| | | | | |
|---|---|---|---|---|
| 2015/0339533 A1* | 11/2015 | Liu | ........................ | G06V 20/58 382/104 |
| 2016/0078298 A1* | 3/2016 | Wu | ..................... | H04N 5/23296 348/143 |
| 2018/0017778 A1* | 1/2018 | Ikuta | ................... | G02B 23/2469 |
| 2018/0096487 A1* | 4/2018 | Nash | ....................... | G06T 5/002 |
| 2018/0181811 A1 | 6/2018 | Yakishyn et al. | | |
| 2018/0182083 A1* | 6/2018 | Natroshvili | ............ | G06K 9/627 |
| 2018/0255290 A1* | 9/2018 | Holzer | ................. | H04N 13/366 |
| 2019/0012766 A1* | 1/2019 | Yoshimi | ................ | G02B 27/64 |
| 2019/0080439 A1* | 3/2019 | Wu | ..................... | A61B 1/00009 |
| 2019/0130215 A1* | 5/2019 | Kaestle | ................... | G06V 20/52 |
| 2019/0230380 A1* | 7/2019 | Ogasawara | ........... | G06F 17/156 |

(Continued)

FOREIGN PATENT DOCUMENTS

CN  108230367 A  6/2018

OTHER PUBLICATIONS

Chen et al., Polar Transformation on Image Features for Orientation-Invariant Representations. IEEE Transactions on Multimedia. 2019;21(2):300-313.

(Continued)

*Primary Examiner* — Ming Y Hon
(74) *Attorney, Agent, or Firm* — Wolf, Greenfield & Sacks, P.C.

(57) ABSTRACT

An image processing device has circuitry, which is configured to obtain image data, the image data being generated on the basis of a non-linear mapping defining a mapping between an object plane and an image plane; and to process the image data by applying a kernel of an artificial network to the image data based on the non-linear mapping.

20 Claims, 7 Drawing Sheets

(56) References Cited

U.S. PATENT DOCUMENTS

| | | | | |
|---|---|---|---|---|
| 2020/0111218 | A1* | 4/2020 | Hanwell | G06T 5/002 |
| 2020/0193553 | A1* | 6/2020 | Rhoads | G06T 7/74 |
| 2020/0211188 | A1* | 7/2020 | Gao | G06T 7/0012 |
| 2020/0226377 | A1* | 7/2020 | Campos Macias | G06K 9/6267 |
| 2020/0327367 | A1* | 10/2020 | Ma | G06N 3/04 |
| 2020/0342652 | A1* | 10/2020 | Rowell | G06V 10/82 |
| 2020/0410669 | A1* | 12/2020 | Psota | G06T 7/11 |
| 2021/0019541 | A1* | 1/2021 | Wang | G06V 10/82 |
| 2021/0110018 | A1* | 4/2021 | Rowe | G06N 20/00 |
| 2021/0201039 | A1* | 7/2021 | Frei | G06V 10/82 |
| 2021/0210054 | A1* | 7/2021 | Baijal | G06T 5/003 |
| 2021/0398259 | A1* | 12/2021 | Yamazoe | G06T 5/001 |
| 2021/0407037 | A1* | 12/2021 | Varekamp | G06T 3/0018 |
| 2022/0027715 | A1* | 1/2022 | Carrera | G06N 3/04 |
| 2022/0030177 | A1* | 1/2022 | Newman | H04N 5/23254 |

OTHER PUBLICATIONS

Su et al., Learning Spherical Convolution for Fast Features from 360° Imagery. 31st Conference on Neural Information Processing Systems (NIPS 2017). 11 pages.

* cited by examiner

Fig. 11

IMAGE PROCESSING DEVICE, IMAGE PROCESSING METHOD AND OBJECT RECOGNITION SYSTEM

CROSS-REFERENCE TO RELATED APPLICATIONS

The present application claims priority to European Patent Application 19184963.7 filed by the European Patent Office on Jul. 8, 2019, the entire contents of which being incorporated herein by reference.

TECHNICAL FIELD

The present disclosure generally pertains to an image processing device, an image processing method and an object recognition system.

TECHNICAL BACKGROUND

Generally, artificial networks, such as Deep Neural Network (DNN) and Convolutional Neural Network (CNN) are known, and which are used in many technical fields, such as of image processing. Known image processing devices may use artificial networks, such as DNN and CNN, for object detection, facial recognition, image and video recognition, and the like.

Moreover, DNN and CNN typically have an input layer, an output layer and multiple hidden layers. In image processing, a kernel, or convolution matrix, or the like, which acts like a filter, is a small matrix and it is used for blurring, sharpening, edge detection, and the like. The kernel is convolved with an input, such as an image, and from the convolution between the kernel and the image, an activation map, such as a feature map, is output.

Although there exist techniques for image processing, it is generally desirable to improve image processing devices and methods.

SUMMARY

According to a first aspect, the disclosure provides an image processing device comprising circuitry configured to obtain image data, the image data being generated on the basis of a non-linear mapping defining a mapping between an object plane and an image plane, and to process the image data by applying a kernel of an artificial network to the image data based on the non-linear mapping.

According to a second aspect, the disclosure provides an object recognition system comprising circuitry, and an image processing device comprising circuitry configured to obtain image data, the image data being generated on the basis of a non-linear mapping defining a mapping between an object plane and an image plane, and process the image data by applying a kernel of an artificial network to the image data based on the non-linear mapping, wherein the circuitry of the object recognition system is configured to perform object recognition based on the processed image data.

According to a third aspect, the disclosure provides an image processing method comprising obtaining image data, the image data being generated on the basis of a non-linear mapping defining a mapping between an object plane and an image plane, and processing the image data by applying a kernel of an artificial network to the image data based on the non-linear mapping.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
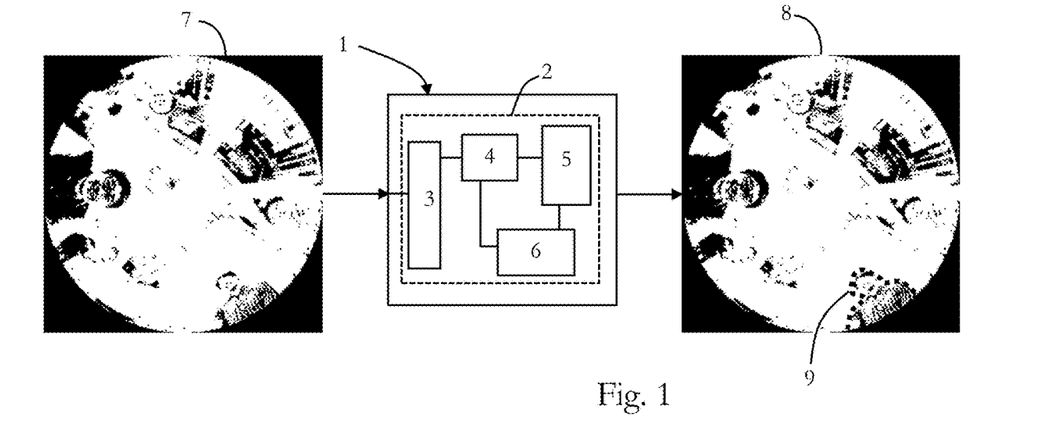
FIG. 1 shows a block diagram of an embodiment of an image processing device.

Before a detailed description of the embodiments under reference of FIG. 1 is given, general explanations are made.

As mentioned in the outset, artificial networks, such as Deep Neural Network (DNN) and Convolutional Neural Network (CNN) are known, and they have reached state-of-the-art level performance in many domains or technical fields, such as of image processing, speech recognition, language processing and the like. CNN is a part of DNN that are usually applied to analyzing visual imagery. In particular, CNN uses image classification algorithms for image and video recognition, image classification, medical image analysis, natural language processing, and the like.

As it is generally known, a CNN may have an input layer and an output layer, as well as multiple hidden layers. The hidden layers of a CNN typically have a number of convolutional layers i.e. pooling layers, fully connected layers and the like. Each convolutional layer within a neural network usually has attributes, such as an input having shape (number of images)×(image width)×(image height)×(image depth), a number of convolutional kernels, acting like a filter, whose width and height are hyper-parameters, and whose depth must be typically equal to that of the image. The convolutional layers convolve the input and pass their result to the next layer. For image processing it is known that images are input into a Conventional CNN, which are rectangular, and, thus, it has rectangular convolutional layers, and its kernels run the image row by row and column by column, which means that a typical path of a kernel is, for example, starting on top left, going to top right, then in the row on the left side going to the right side, etc.

However, it has been recognized that, for example, for circular images that are captured for example from fisheye lens cameras, or for artificial images having a curved shape, a path following the above principle going, for example, row by row as for rectangular images may not be suitable in all cases, since by using, e.g., a fisheye lens, objects in the resulting image are distorted due to the optical characteristic of the fisheye lens.

Consequently, some embodiments pertain to an image processing device including circuitry configured to obtain image data, the image data being generated on the basis of a non-linear mapping defining a mapping between an object plane and an image plane, and to process the image data by applying a kernel of an artificial network to the image data based on the non-linear mapping.

Image processing is generally known, as mentioned above and the image processing device may be configured to obtain image data and then to process the image data.

The image processing device may be a digital (video) camera, a surveillance camera, an edge computing enabled image sensor, such as smart sensor associated with smart speaker, or the like, a smartphone, a personal computer, a laptop computer, a personal computer, a wearable electronic device, electronic glasses, or the like, a circuitry, a processor, multiple processors, logic circuits or a mixture of those parts.

The circuitry may include one or more processors, logical circuits, memory (read only memory, random memory, etc., storage memory, i.e. hard disc, compact disc, flash drive, etc.), an interface for communication via a network, such as a wireless network, internet, local area network, or the like, a CMOS (Complementary Metal Oxide Semiconductor) image sensor, a CCD (Charge Coupled Device) image sensor, or the like.

The image data may be generated by the image sensor, as mentioned above. The image data may be also obtained from a memory included in the device, from an external memory, etc., from an artificial image generator, created via computer generated graphics, onto hemispherical screens, or the like.

The image data are generated on the basis of a non-linear mapping, which is a mapping between an object plane and an image plane. The object plane may correspond to a two-dimensional plane of a real world object captured by the image sensor (wherein, for example, the object plane corresponds to an optical object plane defined by a lens or lens system), or may correspond to an artificially generated image which also has an object plane (corresponding to the plane of the image in this case), or the like.

In some embodiments, the non-linear mapping between the object plane and the image plane may be based on an optical function, which may be defined by a lens, such as fisheye lens, wide-angle lens, ultra-wide-angle lens, or the like, which may project a half-sphere, a part of a half-sphere, or the like, for example, onto an image sensor. The image data may represent then an area of a shape having at least one curve, such as a circle, an ellipse, a snail shape area, or the like.

Thus, in some embodiments, lines which are straight in the object plane become curved in the image plane due to non-linear mapping. Moreover, a size of an object in the image plane may become smaller in certain regions (e.g. in the direction to the center of the image plane) due to the non-linear mapping.

Hence, for instance, by rotating the kernel while running the whole area of the image may be more suitable in some embodiments for circular or fisheye based images than the rectangular based path as discussed above for rectangular images, since (real word) objects are distorted due to the fisheye lens in a circular manner such that by rotating the kernel the kernel can be (approximately) aligned to the circularly distorted objects in the image data (and, e.g., follows the "curved lines" in the image plane which have been straight in the object plane).

The processing of the image data may be either during a training phase of an artificial network or may be a processing of image data with an already trained artificial network, for example, for extracting information from the image data (e.g. object recognition, or recognition of other information in the image data, such as patterns, colors, etc.).

Hence, the artificial network may be an un-trained artificial network or a trained artificial network. Moreover, the artificial network may be part of the image processing device, e.g. stored in a storage or memory of the image processing device, or the image processing device may have access to an artificial network, e.g. based on inter-processor communication, electronic bus, network (including internet), etc.

The image processing device processes the image data by applying a kernel of an artificial network to the image data based on the non-linear mapping. As mentioned above, the kernel may act as a filter or the like in order to extract features or feature maps from an image represented by the image data. The artificial network may be a DNN, a CNN and the like (wherein the CNN can be configured as a DNN), without limiting the present disclosure in that regard.

The application of the kernel to the image data based on the non-linear mapping may include applying the kernel to the image data such that it follows the distortion in the image plane which is introduced by the non-linear mapping. For instance, in the case of curved lines in the image plane which correspond to straight lines in the horizontal and/or vertical direction in the object plane, the kernel can follow these curved lines. In other words, in some embodiments, the kernel follows a pattern in the image plane which is based on a pattern, such as a row-by-row and column-by-column pattern, in the object plane, but being transformed by the non-linear mapping to the image plane. For instance, in the case of a fish-eye lens a rectangular object plane is mapped to a disc in the image plane and horizontal lines in the object plane become circles (or ellipses) and vertical lines of the object plane correspond to lines origin from a center of the disc to the out circumference of the disc. Thus, a row-by-row and column-by-column pattern is mapped or transformed into a pattern where the kernel follows circles (i.e. it rotates) having different diameters, thereby running the whole area of the image. In other words, the kernel may be applied to the image data by running the area of the image, for example, while moving in angular and radius, when the area of the image is a circular area or disc.

In some embodiments, applying the kernel to the image data may include following a predetermined path based on the non-linear mapping. The predetermined path may be a path associated with the non-linear mapping, which is a result of a distortion occurred while mapping an object plane and an image plane, as discussed above. The distortion may occurred because the object plane that corresponds to an optical object plane may be defined by a fisheye lens or the like, or because the object plane may correspond to the plane of an artificial image having a curved shape, as discussed above.

As mentioned above, typically, in conventional CNN, as input are used images, which are rectangular, therefore, the mapping is linear, and, thus, in a Cartesian coordinate system. In the case that input images are not rectangular, since they are based on a non-linear mapping from the object plane to the image plane, usage of a Cartesian coordinate system for defining the path of the kernel may not be suitable. Thus, in some embodiments, the non-linear mapping may include a mapping from a Cartesian coordinate system into a polar coordinate system. For this mapping, a non-linear function may be used, based on which a predetermined path may be derived. The predetermined path (which may follow a pattern, as discussed above, and which may be on a row-by-row and/or column-by-column basis in the object plane, as discussed above), which is associated with the non-linear mapping, may be based on polar coordinates, in some embodiments.

As mentioned, a CNN has convolutional layers and supposing the image used as input is of the shape N×C×D×D, where N is the batch size, C is the number of input channels and D×D is the shape of the input as is usual for convolutional neural networks. For example, in the case that the image is a circular or (circular/elliptic) disc image, its radius is R=D/2. Typically, a convolutional layer is mathematically a cross-correlation operation and therefore, when a polar coordinated system should be applied, as discussed above, the corresponding convolutional layer may be defined as a polar cross-correlation.

Let the said layer having Z output channels and suppose that the output resolution is d×d. Then the output for a specific image may be $I_i$, where i=1, 2, . . . , N in the specific output channel j, where j=1, 2, . . . , Z is given by $$Y_{i,j} = \Sigma_{k=1, \ldots, C} W_{j,k} * X_{i,k}$$

where $X_{i,k}$ denotes the input of i-th image in k-th channel, $Y_{i,j}$ the output of i-th image in j-th channel, $W_{j,k}$ the parameter weights corresponding to channels j, k. The operation * is the already mentioned polar cross-correlation which may be defined as a composition of an one dimensional (1D)-spherical cross-correlation (1D-sphere in two dimensional (2D)-space) and a Cartesian 1D cross-correlation applied in radius coordinate.

The definitions of a discrete 1D cross-correlation (for signal F and kernel K) is given by $$K*F(n) = \Sigma_{m=1, \ldots, M} F(n+m) K(m)$$

and a spherical cross-correlation (of spherical signal P and kernel K) is given by $$K*F(A) = \Sigma_{m=1, \ldots, M} \Phi(R^m A) K(m)$$

for an angle A where R is some rotation operator ($R^m$ is the m-fold application of this rotation operator, and, thus, m=1, . . . , M, wherein "M" is the maximum number of the m-fold application of the rotation operator). Therefore, the polar cross-correlation is given by $$W*X(A,n) = \Sigma_{m=1, \ldots, M} \Sigma_{l=1, \ldots, L} X(R^l A, n+m) W(l,m)$$

Usually convolutional layers are implemented using Fast Fourier Transform (FFT) since a Fourier transform of a cross-correlation is the product of Fourier transforms and there are fast algorithms for calculation of such operations. For spherical cross-correlations, a Generalized Fast Fourier Transform (GFFT) is considered and GFFT is calculated. GFFT is an algebraic Fourier Transform (FT) over specific, in this case, rotational groups. In such a case, a mix of rotational FT and standard FT in radius coordinate may be considered.

As discussed above, the processing of the image data may include applying a kernel—which acts as a filter—of an artificial network, such as a DNN, a CNN and the like, to the image data based on the non-linear mapping. Hence, in some embodiments, a kernel of an artificial network is applied to the image data, the kernel having a size, which may be adapted to the predetermined path. For example, the size of the kernel may be decreased in a direction to a center of an area represented by the image data (wherein objects in the image plane may become smaller in the direction of the center of the image due to the distortion, e.g. caused by a fish-eye lens). That is, as in some embodiments, the image may be a circular image, the size of the applied kernel may be decreased as the kernel follows a predetermined path based on the non-linear mapping, such as moving in a direction of the center of the area of the circular image, which is represented by the image data.

In some embodiments, the predetermined path may be such configured that the kernel completely covers the area represented by the image data. For example, for image processing, such as object detection and face recognition (or for training purposes), the kernel may be applied to the image data such that to completely cover the area represented by the image data. Hence, the kernel in order to cover the whole area of a circular image, for example, it may have to move in accordance with the predetermined path, and thus, its size may be changed.

Moreover, when an object is shifted in a circular, ellipsoid, or the like image, its size and shape may be changed (for example, smaller if closer to center), therefore rotation of the kernel around the center and change the radius may be possible. For example, a circular image is denser closer to the center, i.e. there are less pixels per projected area even though there might be important objects like human heads, and thus, a kernel in the form of a ring sector may be desirable. Considering an off-the-shelf object detection system as an example and applying it in the circular image may give a result like of detecting a wall picture.

In some embodiments, e.g. pertaining to recognition of an object in the image data, a transformation of a detected object into its real-world form of a rectangular image (e.g. object plane) is provided. Moreover, a detected object may be marked with a bounding box after such a transformation. Additionally, in some embodiments, the image represented by the image data in the image plane may be divided into image sectors (e.g. into ring sectors in the case of a circular/elliptic image) and an identification of the image sector which the object is recognized may be provided.

As mentioned, in some embodiments the circuitry may be further configured to input the image data into a convolutional neural network. For example, in some embodiments, the convolutional neural network may include convolutional layers, which are adapted to the non-linear mapping. In some embodiments, the convolutional neural network may also include local or global pooling layers, which reduce the dimensions of the image data, as it is generally known. The pooling layers may be used for pooling, which is a form of non-linear down-sampling, such as spatial pooling, namely max-pooling, average pooling, sum pooling, or the like.

Some embodiments pertain to an object recognition system including circuitry, and an image processing device discussed herein, including circuitry configured to obtain image data, the image data being generated on the basis of a non-linear mapping defining a mapping between an object plane and an image plane, and to process the image data by applying a kernel of an artificial network to the image data based on the non-linear mapping. The circuitry of the object recognition system is configured to perform object recognition based on the processed image data.

The circuitry may include one or more processors, logical circuits, memory (read only memory, random memory, etc., storage memory, i.e. hard disc, compact disc, flash drive, etc.), an interface for communication via a network, such as a wireless network, internet, local area network, or the like, a CMOS (Complementary Metal Oxide Semiconductor) image sensor, a CCD (Charge Coupled Device) image sensor, or the like, and other components which may be used in a object recognition system.

The object recognition system may include a digital (video) camera, a surveillance camera, an edge computing enabled image sensor, such as smart sensor associated with smart speaker, or the like, for capturing an image. Moreover, the object recognition system may be implemented in or as a smartphone, a personal computer, a laptop computer, a wearable electronic device, electronic glasses, or the like, a surveillance camera, an edge computing enabled image sensor, or the like.

Some embodiments pertain to an image processing method, which may be performed by the image processing device described herein, the object recognition system as described herein or any other electronic device, processor, or other computing means or the like. The method includes obtaining image data, the image data being generated on the basis of a nonlinear mapping defining a mapping between an object plane and an image plane, and processing the image data by applying a kernel of an artificial network to the image data based on the non-linear mapping, as discussed herein. As mentioned, the image data may be processed by applying the kernel to the image data, applying the kernel may include following a predetermined path based on the non-linear mapping. The non-linear mapping may include a mapping from a Cartesian coordinate system into a polar coordinate system and the predetermined path may be based on polar coordinates. The kernel may have a size that may be adapted to the predetermined path and which may decrease in a direction to a center of an area represented by the image data, as discussed herein.

Returning to FIG. 1, a block diagram of an embodiment of an image processing device 1 is illustrated, which processes image data being subject of a non-linear mapping with a convolutional neural network (CNN), as mentioned herein.

In the present embodiment, the image processing device 1 includes a circuitry 2 with an interface 3, a Central Processing Unit (CPU) 4, a memory 5 that includes a RAM, a ROM and a storage memory and a trained CNN 6 (which is stored in a memory).

The image processing device 1 acquires through the interface 3, image data representing an image 7 that has been captured with a digital camera. The digital camera has a fisheye lens, such that an object plane (of an object to be imaged) is mapped (with a non-linear mapping) through the fisheye lens on the image plane of an image sensor of the digital camera resulting in the disc-shaped image 7, which represents a 360° field-of-view due to the fisheye lens.

The image data representing the image 7 are transmitted to the CPU 4, which processes the image data based on the non-linear mapping, as discussed herein, by applying a kernel of the CNN 6 to the image data, based on the non-linear mapping introduced by the fisheye lens. The kernel of the CNN 6 acts like a filter, to the image data of the image 7.

The CNN 6 has been trained in advance to process the image data representing the image 7 and to perform object recognition, such that, for example, it is able to output a distribution of features, which have been found in the image data representing the image 7.

In the present embodiment, the image processing device 1 performs object recognition and outputs an image 8, in which a person is recognized and a dashed line 9 surrounds the recognized person in order to visualize the recognized object.

In the following, the application of the kernel of the CNN 6, based on the non-linear mapping introduced by the fisheye lens is explained under reference of FIG. 2.

Figure 2:
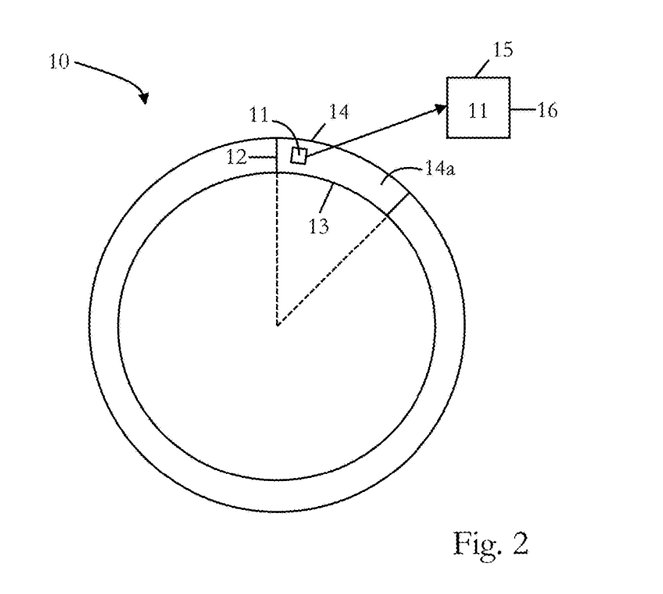
FIG. 2 illustrates the disc-shaped area of the image-disc of the image 7 of FIG. 1.

FIG. 2 illustrates the disc-shaped area 10 of the image-disc of the image 7 of FIG. 1, which is generated on the basis of the non-linear mapping introduced by the fisheye lens between the object plane and the image plane.

The kernel of the CNN 6, illustrated as kernel 11 in FIG. 2, is applied to the image data by rotating it on circular paths in the disc-shaped area 10.

The area 10 is divided into conic sections, wherein one conic section 14 is illustrated in FIG. 2, including at least one region 14a, wherein each region 14a has a width 12 and a length 13. The conic sections are defined on a predetermined angle, which is 45° in the present embodiment, such that the area 10 is divided into eight conic sections 14.

The kernel 11 has a width 15 and a length 16, which is adapted to the width 12 and the length 13 of the region 14a, such that it fits into the region 14a. Generally, the size of the kernel 11 can be adapted in accordance with the specific task or usage of the image processing.

The kernel 11 is rotated, such that a radius vector of the disc area 10 has a perpendicular angle to the lower side of the rectangular kernel 11 (the lower side facing in the direction to the center of the disc area 10).

For defining a path of the kernel 11 to cover the whole area 10, polar coordinates are used and the disc area 10 is further divided in the section as will be discussed under reference of FIG. 3.

Figure 3:
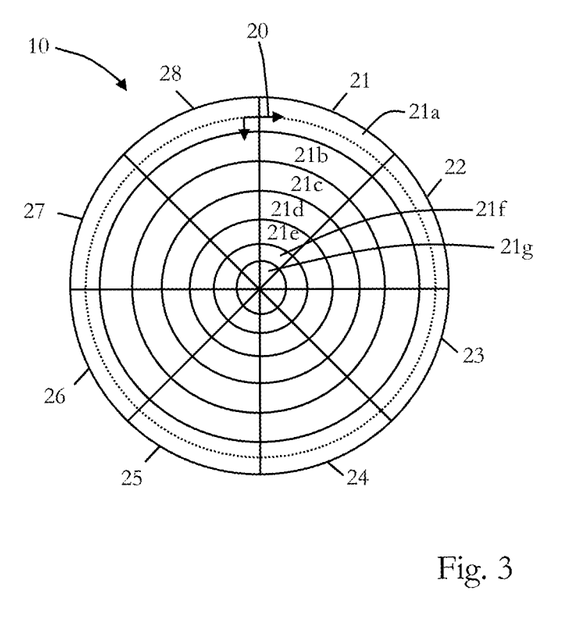
FIG. 3 illustrates the disc area of FIG. 2 divided into eight conic sections.

FIG. 3 illustrates the disc area 10 of FIG. 2 divided into eight conic sections 21 to 28, wherein each of the section 21 to 28 covers an angle of 45°. Moreover, each of the eight conic sections 21 to 28 is divided into eight regions in the direction from the center to the outer circumference of the area 10. FIG. 3 exemplary illustrates eight regions 21a to 21g for the section 21. The regions are defined by a predetermined number of homocentric circles (six in the present embodiment in addition to the out circumference), wherein the intersection of the conic section and the homocentric circles each define a region and wherein the diameter of the circles decrease in the direction of the center. As can be taken from FIG. 3, the size of the regions 21a to 21g decreases accordingly in the direction to the center of the area 10.

As mentioned above under reference of FIG. 2, the kernel 11 is such applied that it rotates, i.e. runs in circles around the center of the disc area 10, wherein path 20 taken by the kernel is defined on the basis of polar coordinates.

In this embodiment, the path 20 is such defined, that the kernel 11 runs circularly around the center in a clockwise direction until 360° are covered, i.e. until each of the outermost regions (21a, . . . ) of the sections 21 to 28 are covered. Then, the kernel 11 is moved in the direction to the center of the disc area 10 about a predefined amount, such that it covers the next inner regions (21b, . . . ) of the sections 21 to 28, when running again counterclockwise and circularly around the center of the disc area 10, thereby covering 360°, etc. In other words, the kernel 11 moves in angle (first until 360° are covered) and then in radius, until the whole disc area 10 is covered. Of course, the present disclosure is not limited in that regard, and the kernel 11 may run counter-clockwise, the order of rotating and shifting in the radius direction may be interchanged, the order can be mixed (e.g. rotation for one section, then shifting in radius, rotation for the next section, then shifting in radius, etc.).

In this embodiment, the application of the kernel to the image data is similar to a standard Cartesian convolution where the kernel is applied to image data of a rectangular image and where it takes a path defined by horizontal and vertical lines, as it will be described under reference of FIG. 5 further below.

As the regions (e.g. 21g) next to the center are smaller than the outer regions, the density of image information is higher in the inner regions compared to the outer regions (whereas the image resolution, thus, may be lower), since an according area of the object plane is mapped to a smaller area/region in the image plane compared to the outer regions.

In this embodiment, the size of the kernel 11 is adapted accordingly to the size of the regions, such that the kernel 11 will be smaller in size for regions closer to the center. In this embodiment, the size of the kernel 11 is adapted to each of the regions, i.e. that the size of the kernel 11 is smaller for region 21b than for region 21a, and is smaller for region 21c than for region 21b, etc.

In other embodiments, the size of the kernel 11 is varied more coarse, e.g. it is only adapted for the smallest region 21g or there are three different sizes, a first size for regions 21a and 21b, a second for regions 21c to 21e and a third for regions 21f and 21g, etc.

Figure 4:
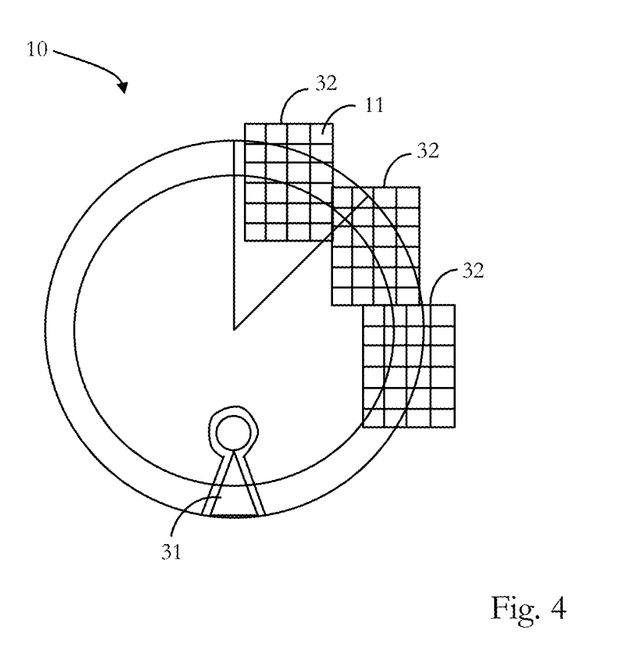
FIG. 4 illustrates the application of the kernel to the disc area of FIG. 2.

FIG. 4 illustrates the application of the kernel 11 to the area 10, where exemplary an object 31 is represented (such as the person detected in image 7 of FIG. 1 and highlighted by line 9 in image 8).

In the case of the digital camera having the fisheye lens, an image having a horizontal field of view of 360° is captured and, depending on the vertical field of view, the fisheye lens projects a half-sphere of the real world or into the image plane (such that the image information density in the image plane is increased in the center compared to the outer region, which, in turn, may mean that the image resolution may be lower in the center). The result of this non-linear mapping is the disc area 10, and by applying the kernel 11—having different kernel positions 32 by following the path 20 explained under reference of FIG. 3—to the area 10, the person/object 31 can be detected.

Due to the non-linear mapping of the fisheye lens, when an object, such as person 31 is shifted, the size and shape changes, in particular, when the object is shifted in the direction to the center or away from the center. Hence, the object 31 will be smaller closer to the center of the image and larger closer to the periphery. Therefore, rotating the kernel around the center and changing the radius as it is the case for the path 20 is more suitable than running the kernel horizontally and vertically, as it is the case for the Cartesian approach (see discussion further below with respect to FIG. 3). As the image is denser closer to the center, i.e. there are less pixels per projected area, such that the information density increases (but information may be lost, since the same amount pixels must represent more image information due to the increased density), it is more difficult to detect objects, even though there might be important objects like, for example, human heads, especially for facial recognition. But, by also varying the size of the kernel 11, as discussed above, object recognition also in these regions can be enhanced.

Typically, the images captured from cameras and used in artificial networks, such as deep neural networks, are rectangular, and therefore, convolutional layers whose kernels run the image row by row and column by column are used. Such a configuration of kernels used in a conventional process of object recognition, is illustrated in FIGS. 5a and 5b, in order to enhance the understanding of the present disclosure.

Figure 5A:
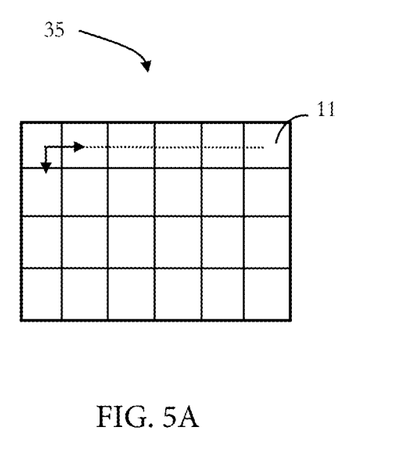
FIG. 5a illustrates a configuration of a plurality of Cartesian kernel positions that is used in a standard Cartesian convolution.

FIG. 5a illustrates a configuration of a plurality of Cartesian kernel positions 35 that is used in a standard Cartesian convolution for a rectangular image where, typically, a linear mapping between an object plane and an image plane is made. In this example, the kernel 11 is applied in different Cartesian kernel positions 35 to image data, which are generated based on a linear mapping between an object plane and an image plane, in an off-the-shelf CNN architecture. The convolutional kernel 11 runs within the image vertically and horizontally, row by row and column by column. As the mapping is linear, even if an object is shifted in the image it would still have the same dimensions and will not have any distortion. Convolutional layers are suitable for images due to the axes-parallel shift invariance.

Figure 5B:
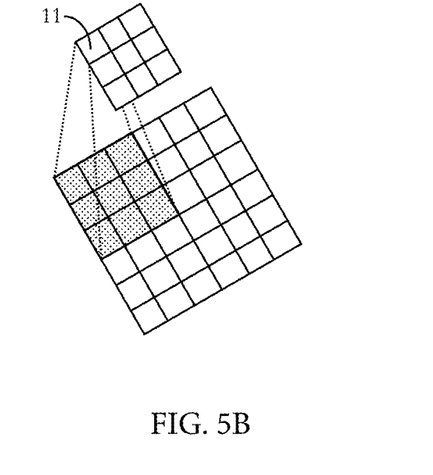
FIG. 5b schematically illustrates a configuration of a kernel of a convolutional neural network.

FIG. 5b schematically illustrates a configuration of a kernel 11 of a convolutional neural network having a size of 3×3 being applied to image data. The image data are generated based on linear mapping and therefore the kernel 11 having the size of 3×3 is moved vertically and horizontally, row by row and column by column, thereby covering the whole image area.

In principle, this type of application of the kernel 11 is also performed by the embodiment of FIGS. 1 to 4, except for that the kernel is rotated and follows the path 20 (and that the size is adapted, as discussed).

Figure 6:
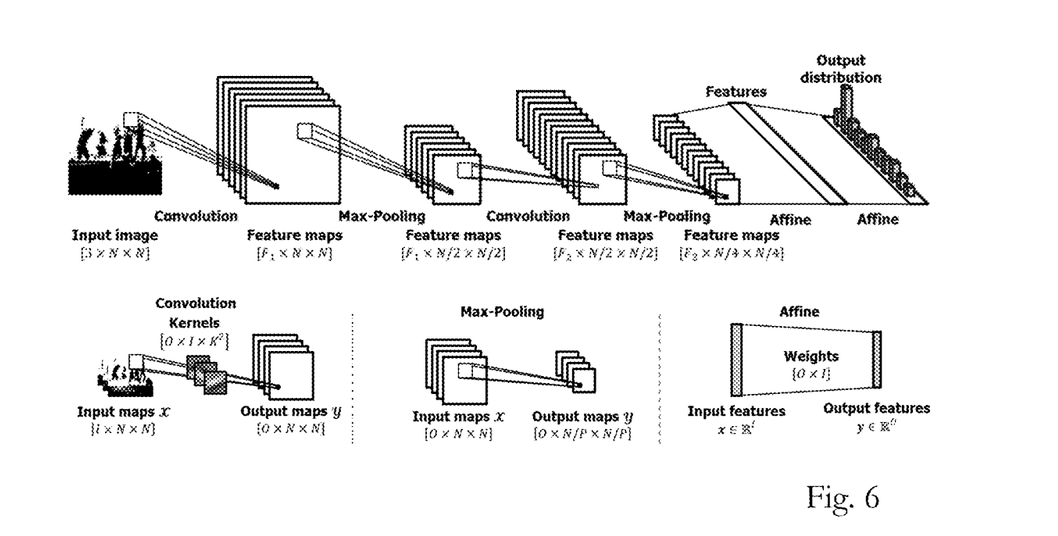
FIG. 6 visualizes the application of a Convolution Neural Network.

The general principle of the usage of the CNN, on which the embodiment of FIGS. 1 to 4 is also based, is exemplary illustrated in FIG. 6, which shows generally in the first line the CNN structure, and in the second line the basic principle of building blocks. The principles of a CNN and its application in imaging is generally known and, thus, it is only briefly discussed in the following under reference of FIG. 6.

The input image includes for example three maps or layers (exemplary red, green and blue (RGB) color information) and N times N blocks. The CNN has a convolutional layer and a subsequent pooling layer, wherein this structure can be repeated as also shown in FIG. 6. The convolutional layer includes the neurons. By applying a kernel (filter) (see convolution kernels in the second line) on the input image, a respective feature map can be obtained. The pooling layer, which is based in the present embodiment on the Max-Pooling (see second line, "Max-Pooling), takes the information of the most active neurons of the convolution layer and discards the other information. After several repetitions (three in FIG. 6), the process ends with a fully-connected layer, which is also referred to as affine layer. The last layer includes typically a number of neurons, which corresponds to the number of object classes (output features) which are to be differentiated by the CNN. The output is illustrated in FIG. 6, first line, as an output distribution, wherein the distribution is shown by a row of columns, wherein each column represents a class and the height of the column represents the weight of the object class. The different classes correspond to the output or image attribute features, which are output by the CNN. The classes are, for example, "people, car, truck, etc." Typically several hundred or several thousand of classes can be used, e.g. also for object recognition of different objects.

In the following, an embodiment of an object recognition system 40 is discussed under reference of FIG. 7, which shows a block diagram of the object recognition system 40.

The object recognition system 40 includes the image processing device 1, which has been described under reference of FIGS. 1 to 4, a circuitry 41 and a surveillance camera 42 with a fisheye lens and that captures images of a real world scene 43.

The object recognition system 40 is configured to perform object recognition of the image data provided by the surveillance camera 42 and processed by the image processing device 1.

In the present embodiment, the image processing device 1 outputs image data representing the scene 43 together with information about objects detect in the image data to the circuitry 41, which uses the image data and the additional information about detected objects to perform object recognition.

Figure 7:
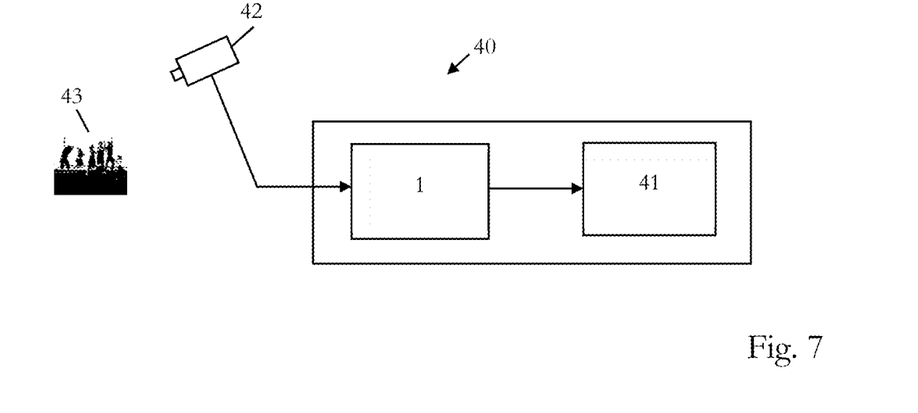
FIG. 7 shows an embodiment of an object recognition system.
Figure 8:
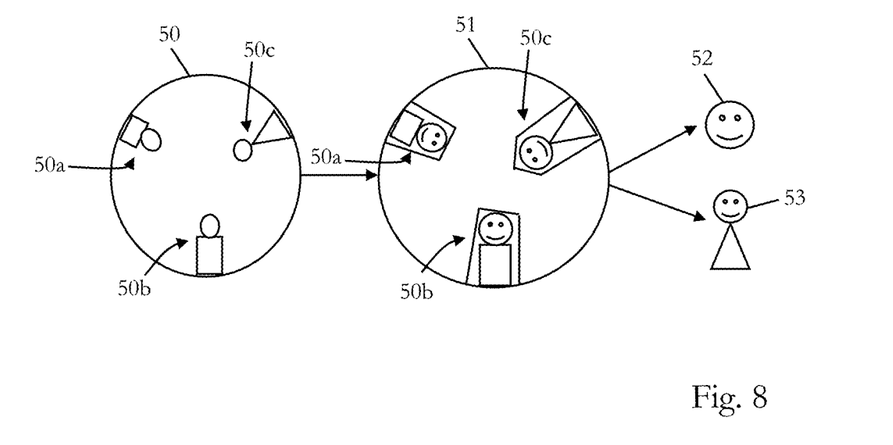
FIG. 8 illustrates a processing scheme performed by the object recognition system of FIG. 7.

The process of object recognition is illustrated in FIG. 8, illustrating a processing scheme performed by the object recognition system 40 of FIG. 7, wherein in the present embodiment a face recognition is performed.

An image 50 of the real scene 43 is output by the surveillance camera 42 and used as an input 50 to the CNN of the image processing device 1. In this embodiment, the CCN is trained to perform face recognition.

The image processing device 1 performs object and face recognition in an area 51 represented by the image data output by the surveillance camera 42. Exemplary, three objects (persons) 50a, 50b and 50c are illustrated in the image 50 and the area 51.

The area 51 corresponds to the area 10 as explained above and the image processing device performs the application of the kernel 11 as discussed under reference of FIGS. 1 to 4.

The image processing device recognizes all three persons 50a, 50b and 50c and their faces as is indicated by the surrounding lines in the middle of FIG. 8 (area 51).

However, a specific person, here person 50c was searched for, and, thus, circuitry 41 recognizes face 52 of the person 50c by comparing it, for example, with correspond database entries and identification information. In order to enhance the visibility of the person 50c, the circuitry 41 performs a rotation of the person object 53 (i.e. a part cropped from image 40 including the image information of person 53) such that it is vertical.

Moreover, circuitry 41 is configured to perform a resizing and a restoration of proportions of the person 53 in order to compensate that the information density in the image 50 changes in the direction to the center, which causes a deformation of the proportions of the image representation of the person 53.

Hence, data augmentation may be enhanced by providing a simple augmentation through rotation, angle cropping with angular resizing and radius cropping with radial resizing. In images such as image of FIG. 8, the information density is higher closer to the center due to the non-linear mapping and thus the reading of the image information by rotational kernels discussed herein may be more detailed closer to the center.

Figure 9:
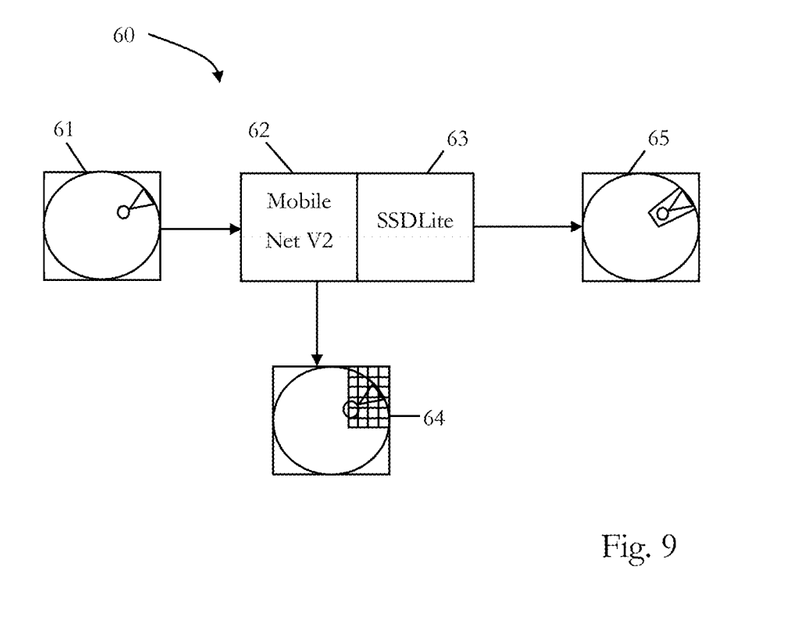
FIG. 9 illustrates an embodiment of a further processing scheme of an image processing device configured as a smartphone performing object detection.

FIG. 9 illustrates an embodiment of a further processing scheme 60 of an image processing device configured as a smartphone performing object detection. An image of a real scene or of an artificial scene is used as an input 61 to a neural network 62 of the device, having a structure of a DNN, and whose architecture is tailored for mobile environments. The neural network 62 acts as features extractor for object detection using a non-linear function that convents an input to an output and it may be similar to a Mobile-NetV2. A Single Shot Detector (SSD) 63 works along with the neural network 62 performing object detection using a probability 64 to output an image 65 having the recognized objects. In this case, an all-day monitoring and a real-time object detection, for example face recognition, and the like, may be performed.

Figure 10:
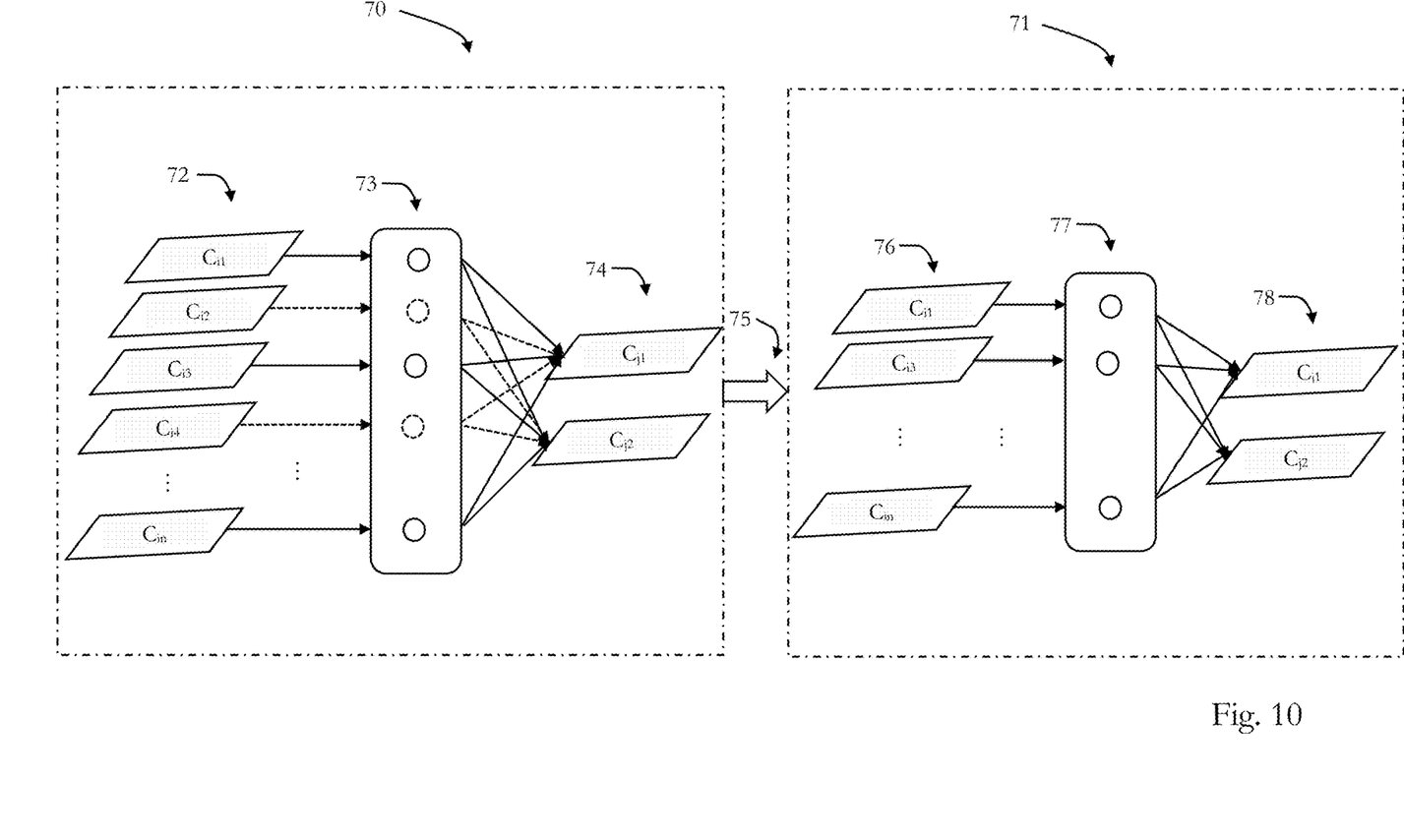
FIG. 10 illustrates a pruning procedure of a Convolution Neural Network.

A pruning procedure of a neural network, such as a CNN, is illustrated in FIG. 10, which shows an initial network 70 and a compact network 71, after the pruning process, and which is implemented in some embodiments in the information processing device 1 and/or in the objection recognition system 40 discussed above.

In the initial network 71, the i-th convolutional layer 72 includes a predetermined number of channels (or neurons in a fully-connected layer). Each channel is associated with a scaling factor from a plurality of scaling factors 73, wherein the scaling factors are depicted with a circle and the dashed lined circles depict the scaling factors with small values.

The channels with small scaling factor values are imposed to zero, and thus, insignificant channels are identified and removed. The scaling factors act as agents for channel selection. As they are jointly optimized with network weights, the network is enabled to automatically identify insignificant channels. Hence, only the significant channels are obtained, included in a j-th convolutional layer 74.

After pruning 75, the compact network 71 includes i-th convolutional layer 76 having a predetermined number of channels, which are fine-tuned. The fine-tuning is performed on the basis of channel scaling factors 77, each one of them corresponds to a specific convolutional channel of a i-th convolutional layer 76, and it results to a narrower j-th convolutional layer 78.

Pruning a channel corresponds to removing all the incoming and outgoing connections of that channel, thus a narrow network may be obtained. The pruning procedure may result to a compact network having high accuracy.

Figure 11:
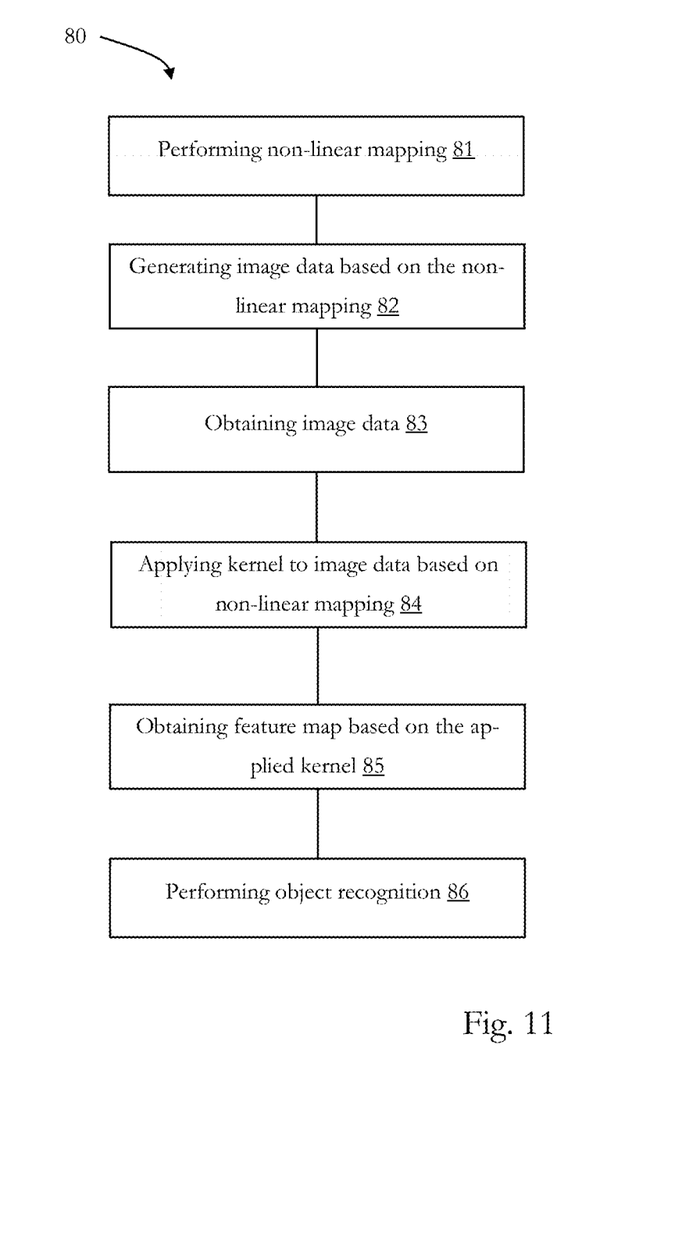
FIG. 11 is a flowchart of an embodiment of an image processing method.

In the following, an image processing method 80, which is performed by the image processing device 1 and/or the object recognition system 40 in some embodiments, is discussed under reference of FIG. 11.

At 81, non-linear mapping is performed between an object plane and an image plane, as discussed above.

Image data are generated, at 82, on the basis of a non-linear mapping.

The image data may be generated from images captured by cameras having fish eye lens or from artificial images having at least one curve, for example circular images, ellipsoidal images, snail-like images etc.

At 83, the image data are obtained, which are generated at 82 on the basis of the non-linear mapping, as discussed above.

At 84, processing of the obtained image data is performed by applying a kernel to the image data based on the non-linear mapping.

The kernel, for example the kernel 11, may be applied to image data generated from circular images and therefore the kernel may be applied in polar coordinates, or the like, as discussed herein.

At 85, a feature map is obtained based on the applied kernel.

At 86, object recognition is performed on the basis of the applied kernel.

It should be recognized that the embodiments describe methods with an exemplary ordering of method steps. The specific ordering of method steps is however given for illustrative purposes only and should not be construed as binding.

The method as described herein is also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An image processing device comprising circuitry configured to:
obtain image data, the image data being generated on the basis of a non-linear mapping defining a mapping between an object plane and an image plane; and
process the image data by applying a kernel of an artificial network to the image data based on the non-linear mapping.

(2) The image processing device of (1), wherein applying the kernel to the image data includes following a predetermined path based on the non-linear mapping.

(3) The image processing device of (2), wherein the non-linear mapping includes a mapping from a Cartesian coordinate system into a polar coordinate system.

(4) The image processing device of (3), wherein the predetermined path is based on polar coordinates.

(5) The image processing device of anyone of (2) to (4), wherein a size of the kernel is adapted to the predetermined path.

(6) The image processing device of (5), wherein the size decreases in a direction to a center of an area represented by the image data.

(7) The image processing device of (6), wherein the predetermined path is such configured that the kernel completely covers the area represented by the image data.

(8) The image processing device of anyone of (1) to (7), wherein the non-linear mapping between the object plane and the image plane is based on an optical function.

(9) The image processing device of (8), wherein the optical function is defined by a lens.

(10) The image processing device of (9), wherein the lens is a fisheye lens.

(11) The image processing device of anyone of (1) to (10), wherein the circuitry is further configured to input the image data in a convolutional neural network.

(12) The image processing device of (11), wherein the convolutional neural network includes convolutional layers adapted to the non-linear mapping.

(13) The image processing device of anyone of (1) to (12), wherein processing the image data includes object recognition.

(14) An object recognition system comprising:
circuitry; and
an image processing device comprising circuitry configured to:
obtain image data, the image data being generated on the basis of a non-linear mapping defining a mapping between an object plane and an image plane; and
process the image data by applying a kernel of an artificial network to the image data based on the non-linear mapping,
wherein the circuitry of the object recognition system is configured to perform object recognition based on the processed image data.

(15) An image processing method, comprising:
obtaining image data, the image data being generated on the basis of a non-linear mapping defining a mapping between an object plane and an image plane; and
processing the image data by applying a kernel of an artificial network to the image data based on the non-linear mapping.

(16) The image processing method of (15), wherein applying the kernel to the image data includes following a predetermined path based on the non-linear mapping.

(17) The image processing method of (16), wherein the non-linear mapping includes a mapping from a Cartesian coordinate system into a polar coordinate system.

(18) The image processing method of (17), wherein the predetermined path is based on polar coordinates.

(19) The image processing method of anyone of (16) to (18), wherein a size of the kernel is adapted to the predetermined path.

(20) The image processing method of (19), wherein the size decreases in a direction to a center of an area represented by the image data.

(21) A computer program comprising program code causing a computer to perform the method according to anyone of (11) to (20), when being carried out on a computer.

(22) A non-transitory computer-readable recording medium that stores therein a computer program product, which, when executed by a processor, causes the method according to anyone of (11) to (20) to be performed.

The invention claimed is:

1. An image processing device comprising circuitry configured to:
obtain image data, the image data being generated on the basis of a non-linear mapping defining a mapping between an object plane and an image plane; and
process the image data by applying a kernel of an artificial network to the image data based on the non-linear mapping, wherein
applying the kernel to the image data includes the kernel following a non-linear path in the image plane according to the non-linear mapping defining the mapping between the object plane and the image plane, the non-linear path being aligned to a distortion in the image plane, and a size of the kernel being adapted to a size of a considered region in the image data.

2. The image processing device according to claim 1, wherein applying the kernel to the image data following the non-linear path in the image plane comprises:
applying the kernel to the image data following a predetermined curved path in the image plane, the predetermined curved path being aligned to the distortion in the image plane, the distortion in the image plane being introduced by the non-linear mapping.

3. The image processing device according to claim 2, wherein the non-linear mapping includes a mapping from a Cartesian coordinate system into a polar coordinate system.

4. The image processing device according to claim 3, wherein the predetermined curved path is based on polar coordinates.

5. The image processing device according to claim 2, wherein a size of the kernel is adapted to the predetermined curved path.

6. The image processing device according to claim 5, wherein the size decreases in a direction to a center of an area represented by the image data.

7. The image processing device according to claim 6, wherein the predetermined curved path is such configured that the kernel completely covers the area represented by the image data.

8. The image processing device according to claim 1, wherein the non-linear mapping between the object plane and the image plane is based on an optical function.

9. The image processing device according to claim 8, wherein the optical function is defined by a lens.

10. The image processing device according to claim 9, wherein the lens is a fisheye lens.

11. The image processing device according to claim 1, wherein the circuitry is further configured to input the image data in a convolutional neural network.

12. The image processing device according to claim 11, wherein the convolutional neural network includes convolutional layers adapted to the non-linear mapping.

13. The image processing device according to claim 1, wherein processing the image data includes object recognition.

14. An object recognition system comprising:
circuitry; and
an image processing device comprising circuitry configured to:
obtain image data, the image data being generated on the basis of a non-linear mapping defining a mapping between an object plane and an image plane; and
process the image data by applying a kernel of an artificial network to the image data based on the non-linear mapping to generate processed image data, wherein
applying the kernel to the image data includes the kernel following a non-linear path in the image plane according to the non-linear mapping defining the mapping between the object plane and the image plane, the non-linear path being aligned to a distortion in the image plane, and a size of the kernel being adapted to a size of a considered region in the image data; and
wherein the circuitry of the object recognition system is configured to perform object recognition based on the processed image data.

15. An image processing method, comprising:
obtaining image data, the image data being generated on the basis of a non-linear mapping defining a mapping between an object plane and an image plane; and
processing the image data by applying a kernel of an artificial network to the image data based on the non-linear mapping, comprising:
applying the kernel to the image data following a non-linear path in the image plane, the non-linear path being aligned to a distortion in the image plane, wherein a size of the kernel being adapted to a size of a considered region in the image data.

16. The image processing method according to claim 15, wherein applying the kernel to the image data following the non-linear path in the image plane comprises:
applying the kernel to the image data following a predetermined curved path in the image plane, the predetermined curved path being aligned to the distortion in the image plane, the distortion in the image plane being introduced by the non-linear mapping.

17. The image processing method according to claim 16, wherein the non-linear mapping includes a mapping from a Cartesian coordinate system into a polar coordinate system.

18. The image processing method according to claim 17, wherein the predetermined curved path is based on polar coordinates.

19. The image processing method according to claim 16, wherein a size of the kernel is adapted to the predetermined curved path.

20. The image processing method according to claim 19, wherein the size decreases in a direction to a center of an area represented by the image data.

* * * * *